ND
United States Patent [19]

Ko et al.

[11] Patent Number: 6,020,439
[45] Date of Patent: Feb. 1, 2000

[54] METHOD OF HYDROGENATION OF LIVING POLYMER

[75] Inventors: Young-Hoon Ko; Hoo-Chae Kim, both of Taejeon, Rep. of Korea

[73] Assignee: Korea Kumho Petrochemical Co., Ltd., Seoul, Rep. of Korea

[21] Appl. No.: 09/013,162

[22] Filed: Jan. 26, 1998

Related U.S. Application Data

[62] Division of application No. 08/723,556, Sep. 30, 1996, abandoned.

[30] Foreign Application Priority Data

Oct. 17, 1995 [KR] Rep. of Korea ................. 95-35847

[51] Int. Cl.⁷ .................... C08C 19/02; C08F 293/00; B01J 31/00
[52] U.S. Cl. ............ 525/338; 525/338; 525/314; 502/113; 502/117
[58] Field of Search .................... 525/338, 314, 525/339; 260/880.13; 502/113, 117; 526/79

[56] References Cited

U.S. PATENT DOCUMENTS

| | | | |
|---|---|---|---|
| 3,494,942 | 2/1970 | Miki | 260/397.5 |
| 3,670,054 | 6/1972 | De La Mare | 260/880 B |
| 3,700,633 | 10/1972 | Wald | 260/880 B |
| 4,501,857 | 2/1985 | Kishimoto et al. | 525/338 |
| 4,673,714 | 6/1987 | Kishimoto et al. | 525/314 |
| 4,980,421 | 12/1990 | Teramoto et al. | 525/338 |
| 5,039,755 | 8/1991 | Chamberlain et al. | 525/338 |
| 5,334,566 | 8/1994 | Gibler et al. | 502/113 |
| 5,643,847 | 7/1997 | Walzer et al. | 502/117 |
| 5,705,571 | 1/1998 | Tsiang et al. | 525/338 |
| 5,739,220 | 4/1998 | Shamshoum et al. | 526/79 |
| 5,753,778 | 5/1998 | Ko et al. | 525/339 |

OTHER PUBLICATIONS

R.Seymour et.al. Polymer Chemistry, 2–nd edition, Marcel Dekker, Inc. pp. 293, 295, 1988.

*Primary Examiner*—David W. Wu
*Assistant Examiner*—Tanya Zalukaeva
*Attorney, Agent, or Firm*—Harrison & Egbert

[57] ABSTRACT

A method for hydrogenating living polymers that include mainly conjugated double bond monomers and aromatic vinyl monomers. At least one conjugated diene compound is polymerized or copolymerized in an inert solvent by using a polymerization initiator of organic alkali metal. The produced polymer is contacted with hydrogen in the presence of a catalyst. The catalyst is formed of a cyclopentadienyl titanium compound represented by:

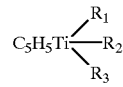

wherein $R_1$, $R_2$ and $R_3$ are independently selected from halogen groups, $C_1$–$C_8$ alkyl groups, $C_1$–$C_8$ alkoxy groups, $C_6$–$C_{20}$ aryloxy groups, $C_6$–$C_{20}$ cycloalkyl groups, silyl groups, and carbonyl groups. A cocatalyst is provided of alkoxylithium compound represented by:

$$R_4O-Li$$

wherein $R_4$ is a hydrocarbon. This cocatalyst selectively hydrogenates the unsaturated double bonds in the conjugated diene units of the living polymer.

7 Claims, No Drawings

METHOD OF HYDROGENATION OF LIVING POLYMER

RELATED APPLICATIONS

The present application is a divisional of U.S. patent application Ser. No. 08/723,556, filed on Sep. 30, 1996, now abandoned entitled "CATALYST FOR HYDROGENATION OF LIVING POLYMER AND HYDROGENATION METHOD USING THE SAME", presently pending.

BACKGROUND OF THE INVENTION

1. Field of the Invention

The present invention relates to a catalyst for hydrogenation of living polymer. More particularly, to an organic titanium catalyst of homogeneous phase having high activity in a reaction in which unsaturated double bonds in conjugated diene units of living polymers are selectively hydrogenated. Also, the present invention is concerned with a method for hydrogenating living polymer, using the catalyst.

2. Description of the Prior Art

Copolymers of conjugated diene monomers, such as 1,3-butadiene and isoprene, with copolymerizable aromatic vinyl monomers, such as styrene, are widely used as elastomers. The block copolymers of conjugated diene monomer and aromatic vinyl monomer are thermoplastic elastomers and can be used as modifiers for polyolefin and polystyrene resins to prepare transparent resins having impact resistance. These copolymers can be vulcanized by the presence of olefinic double bonds in polymers, but have disadvantages that durability and resistance to oxidation against oxygen and ozone in atmosphere are lowered. Thus, such copolymers can be applied only within a limited range where they are not exposed to the air or the outside.

Generally, it can be achieved to improve durability and resistance to oxidation of such copolymers by hydrogenating the olefinic double bonds in the polymers partially or wholly saturating the double bonds.

Many methods for hydrogenation of polymers having olefinic double bonds have been reported. In general, they can be divided into two type methods: one using a heterogeneous catalyst of which metals, such as nickel, paladium, platinum, ruthenium, etc. are dispersed in supports, such as carbon, silica, aluminum, calcium carbonate, etc.; and the other using a homogeneous catalyst of Ziegler catalyst consisting of organic salts of nickel, cobalt, iron, chromium, titanium, or the like and reducing compound such as an organoaluminum or the like, or organometal compound, such as rhodium and titanium.

In the case of using the heterogeneous catalyst, hydrogenation is comprised of dissolving olefinic polymers in appropriate solvents and contacting with hydrogen in the presence of the heterogeneous catalyst. In this method, the contact between reactant and catalyst cannot easily be carried out owing to the steric hindrance and relatively high viscosity of polymer. Also, owing to the strong adsorption between polymer and catalyst, it is very difficult for other unsaturated polymers to access to the active point. For complete addition of hydrogen to the remaining unsaturated polymers, the hydrogenation reaction is required to be carried out at high temperature and at high pressure in the presence of a large amount of catalyst. Such conditions often result in the decomposition of the polymer and gelation thereof and, in the case of the copolymer of conjugated diene and aromatic vinyl monomer, saturation of the aromatic double bonds is simultaneously proceeded. It is therefore difficult to perform selective hydrogenation of olefinic polymer. In addition, it is very difficult for the catalyst to be physically separated from the hydrogenated polymer solution and some heterogeneous catalysts are virtually impossible to be completely removed due to their strong adsorption for the polymers.

In contrast with the heterogeneous catalyst, the homogeneous catalyst shows high activity in hydrogenation and thus, high hydrogenation yield is expected even with a small amount of catalyst under reaction conditions at a low temperature and a low pressure. In addition, hydrogenation can be selectively executed at the double bonds, exclusive of the aromatic moiety, in the copolymer of conjugated diene and aromatic vinyl hydrocarbon under appropriate hydrogenation conditions.

Hydrogenation or selective hydrogenation of conjugated diene polymers is described in many literatures.

U.S. Pat. Nos. 3,494,942, 3,634,594, 3,670,054 and U.S. Pat. No. 3,700,633 disclose use of catalysts containing metal of Periodic Table VIII group or precursors thereof for hydrogenation or selective hydrogenation of ethylenically unsaturated pwymers and ethylenically unsaturated polymers with aromatic groups. In said patents, metal of Periodic Table VIII group, especially, nickel or cobalt compound is formulated with a reducing agent, such as aluminum alkyl, to prepare useful catalyst. Also, there is described in the prior arts that aluminum alkyl is preferred reducing agent, but I-A, II-A and III-B group metals of Periodic Table, especially, lithium and magnesium alkyls or hydrides thereof are effective reducing agents. The mole ratio of I-A, II-A or III-B group metal to VIII group metal is in the range of 0.1:1 to 20:1 and preferably 1:1 to 10:1.

U.S. Pat. No. 4,501,857 suggests that the double bonds present in conjugated diene polymers can be selectively hydrogenated by hydrogenating the polymers in the presence of at least one of bis(cyclopentadienyl)titanium compounds and at least one of lithium hydrocarbon compounds.

U.S. Pat. No. 4,980,421 describes that alkoxy lithium compounds formulated with bis(cyclopentadienyl)titanium compounds and optionally at least one of reducing organometallic compound such as aluminium, zinc and magnesium compounds have analogous hydrogenation activity, wherein alkoxy lithium compounds could be directly added or be added as a reaction mixture of organic lithium compounds with alcoholic or phenolic compounds.

U.S. Pat. No. 4,673,714 showed that bis(cyclopentadienyl)titanium compounds could preferably hydrogenate the double bonds of conjugated diene without using alkyl lithium. It was mentioned that this titanium compound was bis(cyclopentadienyl)titanium diaryl compounds and that an advantage of this catalyst system is no use of lithium hydrocarbon compound.

U.S. Pat. No. 5,039,755 discloses a hydrogenation method in which conjugated diene monomers are polymerized or copolymerized with a polymerization initiator of organic alkali metal, to produce living polymers. The polymerization of the produced living polymer is terminated by adding hydrogen. The selective hydrogenation of the double bonds in conjugated diene units of the terminated polymer is carried out with $(C_5H_5)_2TiR_2$ (R=arylalkyl).

However, since the homogeneous catalyst appears that its hydrogenation activity is largely changed depending on the reduction state of the catalyst, it is difficult to obtain hydrogenated polymer having high yield and reproducibility. In addition, the active ingredients of the catalyst are tend to be changed into inactive ones by impurities in the reaction system. So, the impurities serve as a factor which lowers the reproducibility of the catalyst. Such inactivation of the homogeneous catalyst causes a serious problem in the hydrogenation of polymer for improving durability and resistance to oxidation.

In general, hydrogenation using homogeneous catalysts is not sufficiently rapid in hydrogenation rate and its activity depends on the reduction state of catalyst and impurities in the reaction system. Hence, the conventional homogeneous catalysts are problematic in applying the hydrogenation reaction of polymer on an industrial scale. Therefore, there has been strongly required a catalyst which is able to show high hydrogenation rate and produce highly hydrogenated polymer, without being affected by impurities of the reaction system and the preparation condition of catalyst.

The above-mentioned problems, however, cannot be solved by the catalysts suggested in the literatures and patents published thus far.

SUMMARY OF THE INVENTION

The above problems can be solved by using a catalyst comprising cyclopentadienyl titanium compound as main catalyst and alkoxy lithium compound as a cocatalyst according to the present invention. That is, the hydrogenated polymers can be prepared from living polymers which consists mainly of conjugated double bond monomers and aromatic vinyl monomers, in high hydrogenation rate and reproducibility, by using the catalyst, according to the present invention, having high activity and not being affected by impurities in the reaction system and the preparation conditions of catalyst.

Accordingly, it is an object of the present invention to provide a catalyst for hydrogenation of living polymers which consists mainly of conjugated double bond monomers and aromatic vinyl monomers, comprising cyclopentadienyl titanium compound, represented by the following general formula I as main catalyst:

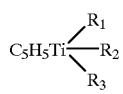

[I]

wherein $R_1$, $R_2$ and $R_3$ may be the same or different and are independently selected from the group consisting of halogen groups, $C_1$–$C_8$ alkyl groups, $C_1$–$C_8$ alkoxy groups, $C_6$–$C_{20}$ aryloxy groups, $C_6$–$C_{20}$ cycloalkyl groups, silyl groups, and carbonyl groups; and alkoxylithium compound represented by the following general formula II as a cocatalyst:

[II]

wherein $R_4$ is a hydrocarbon.

It is another object to provide a method for hydrogenating living polymers which consists mainly of conjugated double bond monomers and aromatic vinyl monomers, in which at least one of conjugated diene compound is polymerized or copolymerized in an inert solvent by using a polymerization initiator of organic alkali metal, to prepare a living polymer and the produced polymer is contacted with hydrogen in the presence of a catalyst comprising cyclopentadienyl titanium compound of the above formula I and alkoxylithium compound of the above formula II.

DETAILED DESCRIPTION OF THE INVENTION

By the hydrogenation catalyst according to the present invention can be selectively hydrogenated unsaturated double bonds in conjugated diene units of conjugated diene living polymers, and living copolymers or random or block copolymers of conjugated diene monomer and copolymerizable vinyl-substituted aromatic monomer, having molecular weight of 500 to 1,000,000. Without using a cocatalyst, hydrogenation occurs partially at 1,2-vinyl bond units but does not proceed at 1,4-butadiene units. Therefore, it is necessary to use the catalyst in combination with a cocatalyst to selectively hydrogenate the olefinic unsaturated double bonds in high yield. Preferably, the cocatalyst is an alkoxy lithium compound.

Ethylenically unsaturated and aromatically unsaturated polymers are prepared by homopolymerizing at least one of polyolefin, especially, diolefin or copolymerizing them with at least one of alkenyl aromatic hydrocarbon monomers, if necessary.

Copolymers may be not only of linear or radial type but also of random, tapered, block or any combination thereof.

Ethylenically unsaturated copolymers or ethylenically and aromatically unsaturated copolymers may be prepared by using an anionic initiator or polymerization catalyst, such as organolithium compound. The preparation of such polymers can be carried out by bulk, solution or emulsion technique. Conjugated dienes which can be polymerized in anionic type include conjugated dienes containing $C_4$–$C_{12}$ carbon atoms, such as 1,3-butadiene, isoprene, pipenylene, phenylbutadiene, 3,4-dimethyl-1,3-hexadiene and 4,5-diethyl-1,3-octadiene, and preferably conjugated dienes containing $C_4$–$C_8$ carbon atoms. Copolymerizable alkenyl aromatic hydrocarbons include vinyl aryl compounds, such as styrene, alkyl-substituted styrene, alkoxy-substituted styrene, 2-vinylpyridine, 4-vinylpyridine, vinylnaphthalene, and alkyl-substituted vinylnaphthalene.

In accordance with the present invention, the living polymer solution obtained by polymerizing conjugated diene monomers in an inert solvent is used, in hydrogenation as such. Therefore, the hydrogenation is succesively carried out. Herein, the term of living polymer means a polymer having activity in terminal. The inert solvent is a solvent which does not react with any reactants for polymerization or hydrogenation, at all, and is preferably exemplified by aliphatic hydrocarbons, such as n-pentane, n-hexane, n-heptane, n-octane and the like, cyclic hydrocarbons, such as cyclohexane, cycloheptane and the like, and ethers, such as diethyl ether, tetrahydrofuran and the like, and the mixtures thereof. Aromatic hydrocarbons, such as benzene, toluene, xylene and ethylbenzene, can be employed, which do not allow the double bonds of the aromatic moieties to be saturated with hydrogen under selected hydrogenation conditions.

The hydrogenation of the present invention is carried out with a living polymer concentration of 1 to 50% by weight based on the total weight of the solvent and preferably with a living polymer concentration of 5 to 25% by weight. Particularly, it is necessary that the living polymer provided for hydrogenation is not inactivated by the moisture or impurities in the solution.

In accordance with the present invention, hydrogenation is carried out by maintaining a living polymer solution at a certain temperature under a hydrogen or inert atmosphere, adding hydrogenation catalyst with or without stirring and providing hydrogen gas at a constant pressure. Herein, the inert atmosphere means one which does not react with any reactants for hydrogenation at all, including helium, nitrogen, argon and the like. Air or oxygen is not so desirable that hydrogenation catalyst may be oxidized or decomposed to result in lowering catalyst activity. Organic titanium compound and alkoxy lithium compound are mixed with each other in a suitable solvent under an inert atmosphere to prepare catalyst and then catalyst is introduced into a reactor. The mixing mole ratio of alkoxy lithium to titanium is preferably in the range of 1 to 3. For example, if the mole ratio of alkoxy to titanium is less than 1, the catalyst has not so sufficient activity as to occur effective hydrogenation in mild conditions. On the other hand, if the mole ratio of alkoxy lithium to titanium is over 3, the activity is not outstandingly increased. On the contrary, it is disadvantageous in view of economics to use alkoxy lithium excessively. In effecting hydrogenation on the living polymer according to the present invention, the mole ratio of reducing lithium to titanium in the living polymer is advantageously in the range of 2:1 to 10:1. Thus, hydrogenation catalyst must be maintained in an amount of 0.05–5 mmol per 100 g of living polymer, in order to maintain the ratio of lithium to titanium of 1 to 10.

Generally, hydrogenation is performed at a temperature of 0 to 150° C. For example, at less than 0° C., catalyst for hydrogenation comes to have low activity, resulting in a decrease of hydrogenation rate. In this case, a large quantity of catalyst is therefore needed, causing an economical loss and lowering the solubility of the hydrogenated polymer. Thus, it is easy to be deposited. On the other hand, at temperatures more than 150° C., the catalyst is also inactivated and the polymer is subjected to gelation or decomposition. In addition, since a hydrogenation can easily occur at the double bonds of aromatic moieties at high temperatures, hydrogenation selectivity is lowered. Preferred reaction temperature ranges from 50 to 140° C.

A particular limit is not given to the pressure of hydrogen used for hydrogenation. Typically, hydrogenation is performed under a hydrogen pressure of 1–100 kg/cm$^2$. For example, if hydrogen pressure is below 1 kg/cm$^2$, hydrogenation rate is low. On the other hand, a hydrogen pressure of higher than 100 kg/cm$^2$ causes gelation as a side-reaction. Thus, the preferred hydrogen pressure is 2 to 30 kg/cm$^2$, and the optimal hydrogen pressure is selected in consideration of the hydrogenation conditions including the amount of the catalyst. In general, when an amount of hydrogenation catalyst is low, it is preferred that higher pressure is selected.

In the presence of the hydrogenation catalyst of the present invention, the hydrogenation is performed for a period of from several seconds to, in extreme cases, five hundred hours. Within this range, the reaction time of hydrogenation may be selected depending on the change of hydrogenation conditions.

Any process type, for example, batch type, continuous type or any combination thereof can be employed to proceed the hydrogenation using the catalyst of the present invention and the progress state of hydrogenation can be identified by determining the absorption amount of hydrogen.

In accordance with the present invention, it is possible to obtain hydrogenated polymers in which more than 50%, preferably 90%, of unsaturated double bonds in conjugated diene units of polymers are hydrogenated. More preferably, when copolymers of conjugated diene monomers and vinyl-substituted aromatic hydrocarbons are hydrogenated, it is also possible to obtain hydrogenated copolymer in which hydrogenation yield is at least 90% for the conjugated diene unit and simultaneously not more than 10% for the aromatic double bonds.

After completing hydrogenation, the hydrogenated polymer can be easily isolated, if necessary, by removing catalyst residue from the polymer solution. For example, a polar solvent, such as acetone or alcohol, is added to the polymer solution to precipitate the polymer, the solution is placed in a hot bath and stirred to separate polymer from solvent, or reaction solution is directly heated to vaporize solvent.

As described hereinbefore, based on the present invention, it is possible to hydrogenate conjugated diene polymer under a mild condition in the presence of a highly active catalyst, especially to selectively hydrogenate unsaturated double bonds in conjugated diene units of copolymer consisting of conjugated diene and vinyl-substituted aromatic hydrocarbon. Particularly, the present invention has several economical advantages which are very useful for industrial application. For example, since living polymers are used as materials, hydrogenation is continuously executed in the same reactor. In addition, the hydrogenation catalyst of the present invention has very high activity so that it may be added in small amounts. Further, no deashing process is required after hydrogenation.

A better understanding of the present invention may be obtained in light of following examples which are set forth to illustrate, but are not to be construed to limit, the present invention.

Hydrogenation was carried out in the presence of a cocatalyst in Examples, while it was carried out without using the cocatalyst in Comparative Example.

SYNTHESIS EXAMPLE I

In a 2 gallon autoclave reactor, 4,500 g of cyclohexane was placed. 9 g of tetrahydrofuran, 112.5 g of styrene monomer and 1.6 g of n-butyllithium were charged into the reactor and then the reaction mixture was subjected to polymerization for 1 hour. Thereafter, 525 g of 1,3-butadiene monomer were injected into the reactor to polymerize for one hour. Finally, 112.5 g of styrene monomer was added and then polymerized for one hour to obtain styrene-butadiene-styrene living block copolymer with a number average molecular weight of about 60,000 which had a styrene content of 30.54% (block styrene content of 30.3%) and 1,2-vinyl bond content of 39.80% (27.8% when reduced into whole polymer). Living lithium in the polymer was present in an amount of 1.67 mmol per 100 g of polymer.

SYNTHESIS EXAMPLE II

In a 2 gallon autoclave reactor, 4,500 g of cyclohexane was placed. 9 g of tetrahydrofuran, 112.5 g of styrene monomer and 1.7 g of n-butyllithium were charged into the reactor and then the reaction mixture wsa subjected to polymerization for 1 hour. Thereafter, 525 g of 1,3-butadiene monomer were injected into the reactor to polymerize for one hour. Finally, 112.5 g of styrene monomer was added and then polymerized for one hour to obtain styrene-butadiene-styrene living block copolymer with a number average molecular weight of about 50,000 which had styrene content of 30.87% (block styrene content of 30.1%) and 1,2-vinyl bond content of 41.31% (28.9% when reduced into whole polymer). Living lithium in the polymer was present in an amount of 2.00 mmol per 100 g of polymer.

SYNTHESIS EXAMPLE III

In a 2 gallon autoclave reactor, 4,500 g of cyclohexane was placed. 9 g of tetrahydrofuran, 112.5 g of styrene monomer and 1.3 g of n-butyllithium were charged into the reactor and then the reaction mixture was subjected to polymerization for 1 hour. Thereafter, 525 g of 1,3-butadiene monomer was injected into the reactor to polymerize for one hour. Finally, 112.5 g of styrene monomer was added and then polymerized for one hour to obtain styrene-butadien-styrene living block copolymer with a number average molecular weight of about 100,000 which had a styrene content of 29.9% (block styrene content of 29.5%) and 1,2-vinyl bond content of 39.6% (27.9% when reduced into whole polymer). Living lithium in the polymer was present in an amount of 1.00 mmol per 100 g of polymer.

SYNTHESIS EXAMPLE IV

In a 2 gallon autoclave reactor, 4,500 g of cyclohexane was placed. 9 g of tetrahydrofuran and 1.5 g of n-butyllithium were charged into the reactor, followed by simultaneously injecting 225 g of styrene monomer and 525 g of 1,3-butadiene monomer into the reactor to polymerize for 1 hour. As a result, styrene-butadiene-styrene living block copolymer with a number average molecular weight of about 50,000 was obtained in which the styrene content amounted to 29% and 1,2-vinyl bond content to 30.5% (21.4% when reduced into whole polymer). Living lithium in the polymer was present in an amount of 1.6 mmol per 100 g of polymer.

COMPARATIVE EXAMPLE I

In a one gallon autoclave reactor 1,050 g of the solution of 14.3 percent by weight living polymer solution obtained in Synthesis Example I was poured and heated to 90° C. with shaking at 450 rpm. Simultaneously, 0.6 mmol of cyclopentadienyl titanium trichloride dissolved in 10 ml of tetrahydrofuran was added in the reactor. Then, the pressure of reactor was risen with 10 kg/cm$^2$ of hydrogen pressure to hydrogenate for 3 hours. After completion of the reaction, the reactor was cooled and lowered to the ambient pressure and the reaction solution was poured in a water-vapor mixture solution.

H-NMR of the resulting hydrogenated polymer revealed that the yield of hydrogenation was 44% for the whole polymer, 95% for 1,2-vinyl bond unit and 5% for 1,4-butadiene unit. No hydrogenation occurred in styrene moieties.

EXAMPLE I

In a one gallon autoclave reactor 1,050 g of the solution of 14.3 percent by weight living polymer solution obtained in Synthesis Example I was poured and heated to 90° C. with shaking at 450 rpm. 0.3 mmol of 2,6-di-tertiary-butyl-4-methylphenol lithium and 0.6 mmol of cyclopentadienyl titanium trichloride were dissolved in 10 ml of tetrahydrofuran in such a way that the mole ratio of alkoxylithium to titanium might be 0.5 to react for one hour at room temperature, and then, the reactants were added in the reactor. Then, the pressure of reactor was risen with 10 kg/cm$^2$ of hydrogen pressure to hydrogenate for 3 hours. After completion of the reaction, the reactor was cooled and lowered to the ambient pressure and the reaction solution was poured in a water-vapor mixture solution.

H-NMR of the resulting hydrogenated polymer revealed that the yield of hydrogenation was 60% for the whole polymer, 95% for 1,2-vinyl bond unit, and 35% for 1,4-butadiene unit. No hydrogenation occurred in styrene moieties.

EXAMPLE II

In a one gallon autoclave reactor 1,050 g of the solution of 14.3 percent by weight living polymer solution obtained in Synthesis Example I was poured. Under the same conditions as those in Example I, 0.6 mmol of 2,6-di-tertiary-butyl-4-methylphenol lithium and 0.6 mmol of cyclopentadienyl titanium trichloride were dissolved in 10 ml of tetrahydrofuran in such a way that the mole ratio of alkoxylithium to titanium might be 1 to react for one hour at room temperature. Thereafter, the resulting solution was added in the reactor.

H-NMR of the resulting hydrogenated polymer revealed that the yield of hydrogenation was 99% for the whole polymer, 100% for 1,2-vinyl bond unit, and 98% for 1,4-butadiene unit. No hydrogenation occurred in styrene moieties.

EXAMPLE III

In a one gallon autoclave reactor 1,050 g of the solution of 14.3 percent by weight living polymer solution obtained in Synthesis Example I was poured. Under the same conditions as those in Example I, 1.2 mmol of 2,6-di-tertiary-butyl-4-methylphenol lithium and 0.6 mmol of cyclopentadienyl titanium trichloride were dissolved in 10 ml of tetrahydrofuran in such a way that the mole ratio of alkoxylithium to titanium might be 2 to react for one hour at room temperature. Thereafter, the resulting solution was added in the reactor.

H-NMR of the resulting hydrogenated polymer revealed that the yield of hydrogenation was 99% for the whole polymer, 100% for 1,2-vinyl bond unit, and 98% for 1,4-butadiene unit. No hydrogenation occurred in styrene moieties.

EXAMPLE IV

In a one gallon autoclave reactor 1,050 g of the solution of 14.3 percent by weight living polymer solution obtained in Synthesis Example I was poured. Under the same conditions as those in Example I, 1.2 mmol of 2,6-di-tertiary-butyl-4-methylphenol lithium and 0.4 mmol of cyclopentadienyl titanium trichloride were dissolved in 10 ml of tetrahydrofuran in such a way that the mole ratio of alkoxylithium to titanium might be 3 to react for one hour at room temperature. Thereafter, the resulting solution was added in the reactor.

H-NMR of the resulting hydrogenated polymer revealed that the yield of hydrogenation was 97% for the whole polymer, 100% for 1,2-vinyl bond unit, and 95% for 1,4-butadiene unit. No hydrogenation occurred in styrene moieties.

EXAMPLE V

In a one gallon autoclave reactor 1,050 g of the solution of 14.3 percent by weight living polymer solution obtained in Synthesis Example II was poured. Under the same conditions as those in Example I, 0.6 mmol of 2,6-di-tertiary-butyl-4-methylphenol lithium and 0.6 mmol of cyclopentadienyl titanium trichloride were dissolved in 10 ml of tetrahydrofuran in such a way that the mole ratio of alkoxylithium to titanium might be 1 to react for one hour at room temperature. Following this, the resulting solution was added in the reactor.

H-NMR of the resulting hydrogenated polymer revealed that the yield of hydrogenation was 100% for the whole polymer, 100% for 1,2-vinyl bond unit, and 100% for 1,4-butadiene unit. No hydrogenation occurred in styrene moieties.

EXAMPLE VI

In a one gallon autoclave reactor 1,050 g of the solution of 14.3 percent by weight living polymer solution obtained in Synthesis Example II was poured. Under the same conditions as those in Example I, 1.2 mmol of 2,6-di-tertiary-butyl-4-methylphenol lithium and 0.6 mmol of cyclopentadienyl titanium trichloride were dissolved in 10 ml of tetrahydrofuran in such a way that the mole ratio of alkoxylithium to titanium might be 2 to react for one hour at room temperature and then, added in the reactor.

H-NMR of the resulting hydrogenated polymer revealed that the yield of hydrogenation was 99% for the whole polymer, 100% for 1,2-vinyl bond unit, and 98% for 1,4-butadiene unit. No hydrogenation occurred in styrene moieties.

EXAMPLE VII

In a one gallon autoclave reactor 1,050 g of the solution of 14.3 percent by weight living polymer solution obtained in Synthesis Example I was poured. Under the same conditions as those in Example II, 1.8 mmol of 2,6-di-tertiary-butyl-4-methylphenol lithium and 0.6 mmol of cyclopentadienyl titanium trichloride were dissolved in 10 ml of tetrahydrofuran in such a way that the mole ratio of alkoxylithium to titanium might be 3 to react for one hour at room temperature. The resulting reaction was added in the reactor.

H-NMR of the resulting hydrogenated polymer revealed that the yield of hydrogenation was 99% for the whole polymer, 100% for 1,2-vinyl bond unit, and 98% for 1,4-butadiene unit. No hydrogenation occurred in styrene moieties.

EXAMPLE VIII

In a one gallon autoclave reactor 1,050 g of the solution of 14.3 percent by weight living polymer solution obtained in Synthesis Example III was poured. Under the same conditions as those in Example I, 0.5 mmol of 2,6-di-tertiary-butyl-4-methylphenol lithium and 0.5 mmol of cyclopentadienyl titanium trichloride were dissolved in 10 ml of tetrahydrofuran in such a way that the mole ratio of alkoxylithium to titanium might be 1 to react for one hour at room temperature. Thereafter, the resulting solution was added in the reactor.

H-NMR of the resulting hydrogenated polymer revealed that the yield of hydrogenation was 97% for the whole polymer, 100% for 1,2-vinyl bond unit, and 95% for 1,4-butadiene unit. No hydrogenation occurred in styrene moieties.

EXAMPLE IX

In a one gallon autoclave reactor 1,050 g of the solution of 14.3 percent by weight living polymer solution obtained in Synthesis Example IV was poured. Under the same conditions as those in Example I, 0.6 mmol of 2,6-di-tertiary-butyl-4-methylphenol lithium and 0.6 mmol of cyclopentadienyl titanium trichloride were dissolved in 10 ml of tetrahydrofuran in such a way that the mole ratio of alkoxylithium to titanium might be 1 to react for one hour at room temperature. Thereafter, the resulting solution was added in the reactor.

H-NMR of the resulting hydrogenated polymer revealed that the yield of hydrogenation was 99% for the whole polymer, 100% for 1,2-vinyl bond unit, and 98% for 1,4-butadiene unit. No hydrogenation occurred in styrene moieties.

EXAMPLE X

In a one gallon autoclave reactor 1,050 g of the solution of 14.3 percent by weight living polymer solution obtained in Synthesis Example II was poured. Under the same conditions as those in Example I, 0.6 mmol of 2,6-di-tertiary-butyl-4-methylphenol lithium and 0.6 mmol of cyclopentadienyl titanium trichloride were dissolved in 10 ml of tetrahydrofuran in such a way that the mole ratio of alkoxylithium to titanium might be 1 to react for one hour at room temperature. Thereafter, the resulting solution was added in the reactor.

H-NMR of the resulting hydrogenated polymer revealed that the yield of hydrogenation was 99% for the whole polymer, 100% for 1,2-vinyl bond unit, and 98% for 1,4-butadiene unit. No hydrogenation occurred in styrene moieties.

EXAMPLE XI to XVI

In these examples, the effect of various cocatalysts, i.e. alkoxy lithium compounds, was investigated by using the hydrogenation procedure under the same conditions as those in Example I and the living polymer solution obtained in Synthesis Example II. Table 1 below shows kinds and amounts of the catalyst and cocatalysts as used, the RO-Li/Ti ratio, and the degree of hydrogenation.

TABLE 1

| Example | XI | XII | XIII | XIV | XV | XVI |
|---|---|---|---|---|---|---|
| Catalyst | Cyclopentadienyl titanium trichloride | | | | | |
| Cocatalyst | 4-methylphenoxy lithium | | 4-tert-butyl-phenoxy lithium | | 4-octyl-phenoxy lithium | |
| Amount of catalyst, mmol/100 g of polymer | 0.4 | 0.3 | 0.32 | 0.2 | 0.3 | 0.3 |
| Amount of cocatalyst, mmol | 0.8 | 0.8 | 0.7 | 0.4 | 0.6 | 0.8 |
| RO—Li/Ti | 1 | 1.33 | 1.09 | 1 | 1 | 1.33 |
| Degree of hydrogenation | 96.2 | 94.8 | 98.0 | 89.3 | 97.3 | 98.0 |

Other features, advantages and embodiments of the present invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

I claim:

1. A method for hydrogenating living polymers which consists of conjugated double bond monomers and aromatic vinyl monomers, in which at least one conjugated diene compound is polymerized or copolymerized in an inert solvent by using a polymerization initiator of organic alkali metal, the produced polymer is contacted with hydrogen in the presence of a catalyst comprising monocyclopentadienyl titanium compound represented by the following general formula I as main catalyst:

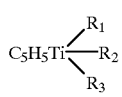

[I]

wherein $R_1$, $R_2$ and $R_3$ may be the same or different and are independently selected from the group consisting of halogen groups, $C_1$–$C_8$ alkyl groups, $C_1$–$C_8$ alkoxy groups, $C_6$–$C_{20}$ aryloxy groups, $C_6$–$C_{20}$ cycloalkyl groups, silyl groups, and carbonyl groups;

and an alkoxylithium compound represented by the following general formula II as cocatalyst:

$$R_4O\text{—}Li \qquad (II)$$

wherein $R_4$ is a substitute group, to selectively hydrogenate the unsaturated double bonds in said conjugated diene units of the living polymer.

2. The method in accordance with claim 1, wherein said catalyst has a mole ratio of monocyclopentadienyl titanium compound to alkoxy lithium compound ranging from 1:1 to 1:3.

3. The method in accordance with claim 1, wherein said polymerization initiator of organic-alkali metal is an organo lithium compound.

4. The method in accordance with claim 1 wherein said cyclopentadienyl titanium compound is monocyclopentadienyl titanium trichloride.

5. The method in accordance with claim 1, wherein the contact with hydrogen is carried out at a temperature of 0 to 150° C. under a hydrogen pressure of 1 to 100 kg/cm² for a period of 30 to 360 minutes in the presence of 0.01 to 20 mmol of cyclopentadienyl titanium compound per 100 g of living polymer.

6. The method in accordance with claim 1, wherein said substitute group in Formula II is 2,6-di-tert-butyl-4-methylphenol.

7. The method in accordance with claim 3, wherein said organic lithium compound is n-butyl lithium.

* * * * *